US006023111A

United States Patent [19]

Noda et al.

[11] Patent Number: 6,023,111

[45] Date of Patent: Feb. 8, 2000

[54] LINEAR ACTUATOR

[75] Inventors: Mitsuo Noda, Ichinomiya; Tsuyoshi Yonezawa, Nakashima-gun, both of Japan

[73] Assignee: Howa Machinery, Ltd., Nagoya, Japan

[21] Appl. No.: 09/080,221

[22] Filed: May 18, 1998

[30] Foreign Application Priority Data

May 20, 1997 [JP] Japan .................................... 9-147245
Jun. 5, 1997 [JP] Japan .................................... 9-165024

[51] Int. Cl.$^{7}$ ...................................................... H02K 41/00
[52] U.S. Cl. ................................................ 310/12; 310/20
[58] Field of Search ................................ 310/12, 13, 14, 310/20, 15, 17; 318/135

[56] References Cited

U.S. PATENT DOCUMENTS

| | | | |
|---|---|---|---|
| 4,545,290 | 10/1985 | Lieberman | 92/88 |
| 5,598,043 | 1/1997 | Hirano et al. | 310/12 |

FOREIGN PATENT DOCUMENTS

| | | |
|---|---|---|
| 0 082 829 | 6/1983 | European Pat. Off. . |
| 0 190 760 | 8/1986 | European Pat. Off. . |
| 0 531 131 | 3/1993 | European Pat. Off. . |
| 0 582 782 | 2/1994 | European Pat. Off. . |
| 85 08 187 U | 5/1985 | Germany . |
| 62-93405 | 6/1987 | Japan . |
| 1-104407 | 7/1989 | Japan . |
| 56-124711 | 9/1991 | Japan . |
| 5-62705 | 8/1993 | Japan . |
| 6-42508 | 2/1994 | Japan . |
| 6-24207 | 3/1994 | Japan . |
| 6-30504 | 4/1994 | Japan . |
| 63-152003 | 10/1998 | Japan . |

*Primary Examiner*—Nestor Ramirez
*Assistant Examiner*—Judson H. Jones
*Attorney, Agent, or Firm*—Finnegan, Henderson, Farabow, Garrett & Dunner, L.L.P.

[57] ABSTRACT

The linear actuator includes a tube provided with a slit which penetrates the wall of the tube and extends parallel to the longitudinal axis of the tube. In the tube, an internal moving body is disposed. The internal moving body moves in the tube along the direction of the longitudinal axis of the tube. An external moving body is disposed outside of the tube and coupled to the internal moving body by a driving member through the slit in the tube so that the external moving body moves integrally with the internal moving body along the slit. Band guides for guiding an outer seal band and an inner seal band are attached to the external moving body. Slider members are disposed between the external moving body and the outer wall surface of the tube to avoid direct contact between the external moving body and the tube. The band guide and the slider member are formed as an integral one-piece element. Therefore, when the band guide is attached to the external moving body, the slider member is simultaneously attached to the external moving body and firmly held in place.

14 Claims, 13 Drawing Sheets

LINEAR ACTUATOR

BACKGROUND OF THE INVENTION

1. Field of the Invention

The present invention relates to a linear actuator having an internal moving body disposed in a tube and moving along the axis of the tube and an external moving body disposed outside the tube and coupled to the internal moving body by a driving member through a slit formed on the wall of the tube. More specifically the present invention relates to a linear actuator provided with a slider member which is disposed between the external moving body and the wall of the tube and with band guides on both ends of the driving member, or a linear actuator provided with a coupling device which connects the external moving body to a sliding body guided along a predetermined moving path.

2. Description of the Related Art

A linear actuator includes a tube (a cylinder barrel) having an axial slit in the wall and an internal moving body disposed in the bore of the tube and movable along the longitudinal axis of the tube. The movement of the piston is transferred to an external moving body by a driving member which couples the external moving body to the internal moving body through a slit formed on the wall of the tube along the longitudinal axis thereof. Usually, an inner seal band and an outer seal band are disposed on the inner and the outer wall surfaces of the tube along the slit in order to close the inner and the outer openings of the slit.

Linear actuators of this type are disclosed in various publications.

For example;

(A) Japanese Unexamined Utility Model Publication (Kokai) No. 5-62705 discloses a linear actuator including a slider member disposed between the external moving body and the outer wall surface of the tube. The slider member is made of synthetic resin and is fitted into a groove formed on the bottom face of the external moving body (i.e., the face of the external moving body facing the outer wall surface of the tube). Further, in the linear actuator of the '705 publication, the internal moving body and the external moving body are connected to each other by a piston yoke through the slit of the tube, and belt separators (band guides) for guiding the inner and the outer seal bands are attached to both ends of the piston yoke.

(B) Japanese Unexamined Utility Model Publication (Kokai) No. 1-104407 discloses a linear actuator including a slider member. The slider member is accommodated in a groove formed on the bottom face of a sliding body. The sliding body is connected to the external moving body. The slider member in the '407 publication is loosely fitted into the groove and is urged against a sliding face formed on the tube outer wall surface by the adjusting screw fitted to the sliding body. The contact between the slider member and the sliding face is adjusted by the adjusting screw.

(C) Japanese Unexamined Patent Publication (Kokai) No. 56-124711 discloses a linear actuator in which separate slider members for sliding on the side walls of the slit are attached to the yoke which connects the internal moving body to the external moving body.

(D) Japanese Unexamined Patent Publication (Kokai) No. 6-42508 and Japanese Unexamined Utility Model Publication (Kokai) No. 6-30504 disclose linear actuators which include slide tables (external moving bodies) formed integrally with the piston yoke. Separate end members are attached to both longitudinal ends of the slide table and a channel groove, through which the outer seal band passes, extends on the top face of the sliding table in the longitudinal direction. A band cover which closes the aperture of the groove is provided. The band cover includes hook shaped engaging members and is fitted to the channel groove by snap fitting the engaging members into the recesses formed on both of the side walls of the channel groove.

(E) Japanese Unexamined Utility Model Publications (Kokai) No. 62-93405 and No. 63-152003 disclose linear actuators including sliding bodies movable along guide rails. In the '405 publication and the '003 publication, the sliding body is provided with a coupling member extending over and covering the top face of the external moving body. The coupling member is attached to the external moving body by fitting a protruding portion formed on one of the coupling member and the external moving body into a recess formed on the other.

(F) Japanese Unexamined Utility Model Publication (Kokai) No. 6-24207 discloses another type of the coupling device for connecting the external moving body to the sliding body. In the '207 publication, a pin member extending in a direction perpendicular to the direction of the movement of the external moving body (i.e., the direction of the longitudinal axis of the tube) is provided on the external moving body. The coupling member extending from the sliding body and covering the top face of the external moving body is provided with engaging grooves for receiving the pin member of the external moving body. The coupling member is attached to the external moving body by engaging the pin member on the external moving body with the engaging grooves on the coupling member.

In the linear actuator in the publication (A), since the slider member and the band guide are attached to the external moving body separately, the number of the elements increases and the assembly process becomes complicated. Further, the slider member in the linear actuator of the publication (A) is fitted into the groove formed on the external moving body. However, in this case, the fitting condition between the slider member and the groove cannot be adjusted once the slider member has been fitted into the groove and the groove and the slider member must be manufactured with high accuracy in order to obtain satisfactory fitting condition between the slider member and the groove. This causes an increase in the manufacturing cost of the linear actuator. Further, since it is difficult to remove the slider member from the groove once the slider member has been fitted into the groove, the slider member is discarded with the external moving body when the linear actuator is scrapped. This makes it difficult to apply recycling processes suitable for the respective materials and may cause environmental problems.

In the linear actuator of the publication (B), the slider member is loosely inserted into the groove on the bottom face of the external moving body and the slider member apt to fall out from the groove during the assembly process. This is especially true when the sliding body is held in the position where the bottom face is facing downward during the assembly. This sometimes makes the assembly process of the linear actuator complicated. Further, since the adjusting screw is required for adjusting the contact between the slider member and the sliding face, the threaded screw hole must be drilled on the slider member in the publication (B). This also increases the number of the manufacturing steps of the linear actuator.

In the linear actuator of the publication (C), separate sliding members are attached to the piston yoke to reduce the friction between the yoke and the wall of the slit and this also causes an increase in the number of elements and the number of assembly steps.

In the linear actuator of the publication (D), since the separate end members are attached to both ends of the slide table, and band guides for guiding the outer seal band are attached to the bottom faces of the end members, the number of elements and the steps of assembly increases. Further, since the outer seal band in the linear actuator of the publication (C) directly contacts the slide table (the external moving body), wear of the seal band and the slide table occurs. When the wear occurs, dust generated by the wear attaches to the surface of the seal band. This causes deterioration of seal performance of the seal band and a shortening of the service life of the seal band. Further, in the linear actuator of the publication (D), since a scraper is fitted into a groove formed on the bottom surface of the slide table, it is difficult to fit the scraper to the slide table. Further, since the band cover in the publication (D) is fitted to the channel groove by the engagement between the engage members and the side walls of the channel groove, it is difficult to remove the band cover from outside.

Further, in the linear actuator of the publication (E), since the top face of the external moving body is covered by the coupling member which connects the external moving body to the sliding body, a space accommodating the coupling member is required above the top face of the external moving body. Therefore, it is difficult to reduce the height of the linear actuator (i.e., the distance between the outer wall of the tube and the upper face of the coupling member).

In the linear actuator of the publication (F), a pin member is used for connecting the external moving body to the coupling member. Therefore, the number of elements and the number of assembly steps increase. Further, to accommodate the pin member in the external moving body, the thickness of the external moving body must be increased. This also causes an increase in the height of the linear actuator.

SUMMARY OF THE INVENTION

In view of the problems in the related art as set forth above, one of the objects of the present invention is to provide a linear actuator in which the assembly of the band guides and slider members can be easily and quickly completed.

Another object of the present invention is to provide a linear actuator in which the slider member is firmly fitted to the external moving body by a simple method which allows the slider member to be easily removed from the external moving body.

Another object of the present invention is to provide a linear actuator in which the contact between the slider member and the sliding face can be easily adjusted in order to eliminate complicated processes for fitting and adjusting the slider member.

Further, another object of the present invention is to provide a linear actuator in which the band cover can be fitted and removed easily while eliminating the direct contact between the seal band and the external moving body.

Another object of the present invention is to provide a linear actuator including a coupling device capable of connecting the sliding body to the external moving body easily and quickly while keeping the height of the linear actuator small.

One or more of the objects as set forth above are achieved by a linear actuator, according to the present invention, comprising a tube provided with a slit which penetrates the wall of the tube and extends parallel to the longitudinal axis of the tube, an internal moving body disposed in the bore of the tube and movable therein along the direction of the longitudinal axis of the tube, an external moving body disposed outside of the tube and coupled to the internal moving body by a driving member through the slit in the tube so that the external moving body moves with the internal moving body along the slit, an outer seal band and an inner seal band extending along and covering the slit from the outside and the inside of the tube, the outer seal band and inner seal band passing inside and outside of the driving member, a slider member attached to the external moving body on the bottom face thereof facing the outer wall surface of the tube and sliding on the outer wall surface with the movement of the external moving body, a pair of band guides attached to the driving member at a longitudinal end thereof for guiding the outer and the inner seal bands to the outer face and inner face of the driving member, wherein the band guide and the slider member are formed as an integral one-piece element.

According to the present invention, since the band guide and the slider member are formed as an integral one-piece element, the assembly of the band guides and the slider member can be done simultaneously. Therefore, the band guides and the slider member can be assembled easily and quickly.

According to another aspect of the present invention, there is provided a linear actuator comprising a tube provided with a slit which penetrates the wall of the tube and extends parallel to the longitudinal axis of the tube, an internal moving body disposed in the bore of the tube and movable therein along the direction of the longitudinal axis of the tube, an external moving body disposed outside of the tube and coupled to the internal moving body by a driving member through the slit in the tube so that the external moving body moves with the internal moving body along the slit, an outer seal band and an inner seal band extending along and covering the slit from the outside and the inside of the tube, the outer seal band and inner seal band passing the outer face and the inner face of the driving member, a sliding member disposed between the driving member and a side wall of the slit extending along the longitudinal axis of the tube to slide on the side wall surface with the movement of the external moving body, a pair of band guides attached to the driving member at a longitudinal end thereof for guiding the outer and the inner seal bands to the outer face and inner face of the driving member, wherein the band guide and the sliding member are formed as an integral one-piece element.

In this aspect of the invention, since the band guide and the sliding member interposed between the driving member and the side wall of the slit are formed as an integral one-piece element, the band guides and the sliding member can be assembled easily and quickly.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
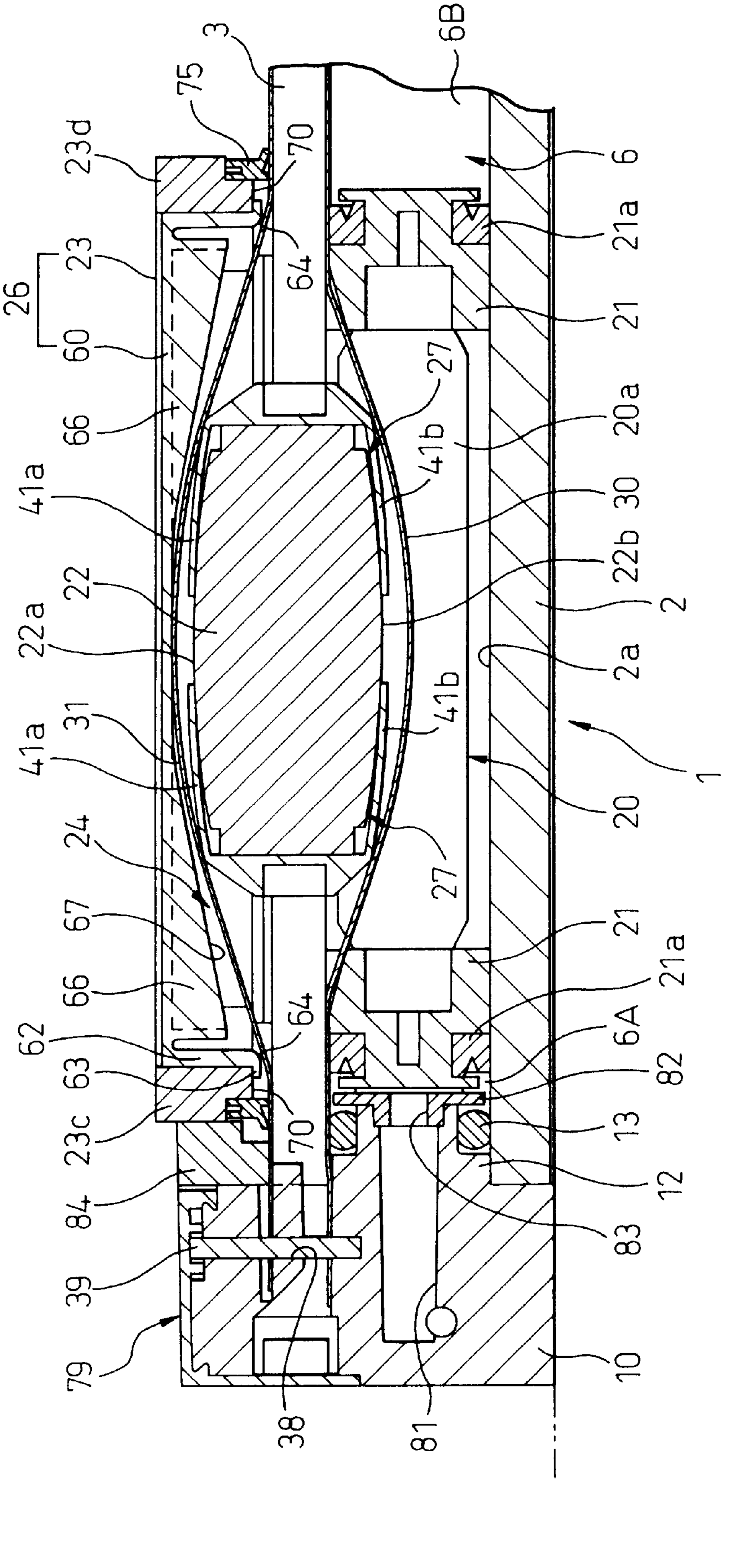
FIG. 1 is a longitudinal sectional view of a linear actuator according to an embodiment of the present invention.
Figure 2:
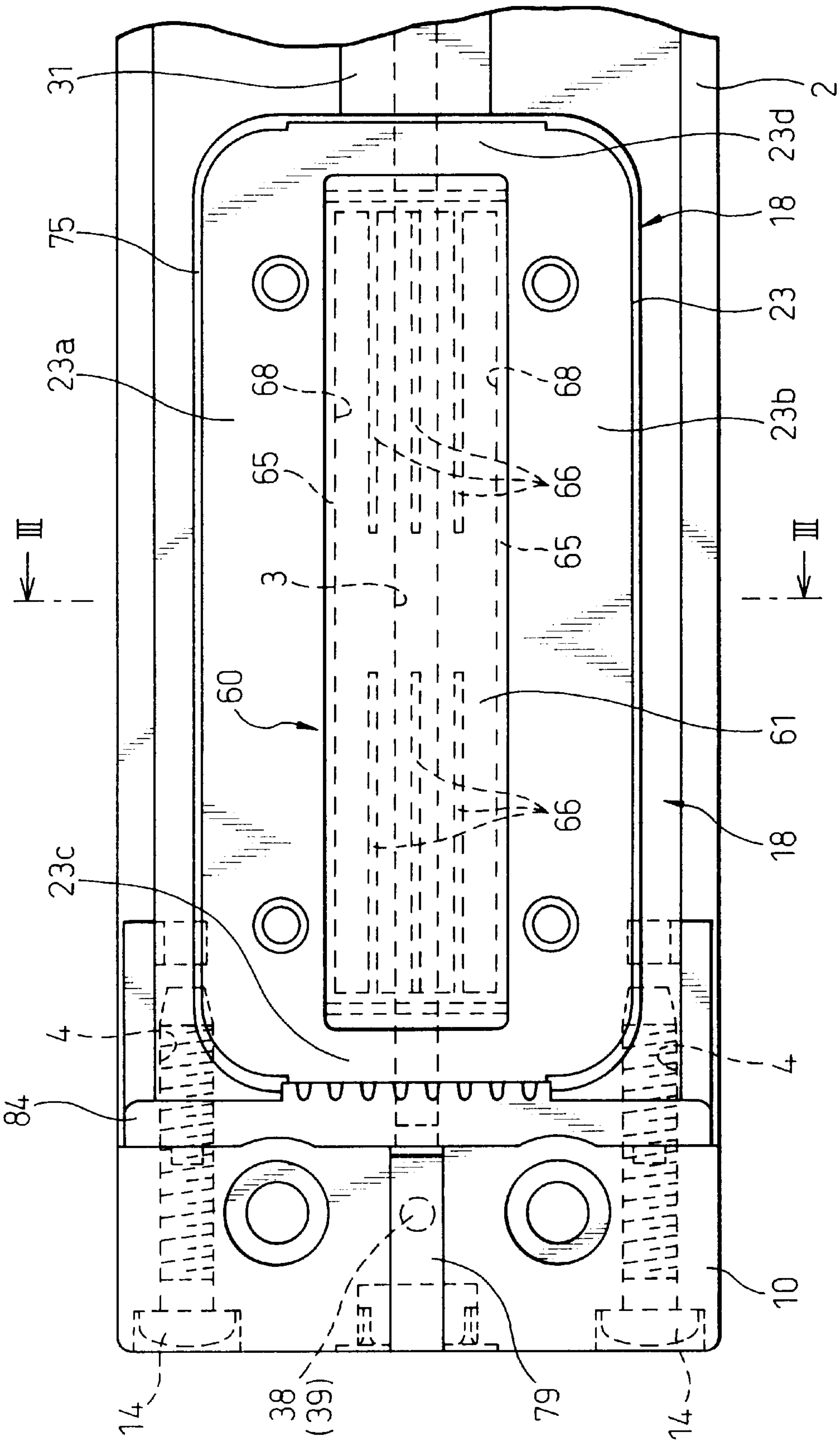
FIG. 2 is a plan view of the linear actuator in FIG. 1.
Figure 3:
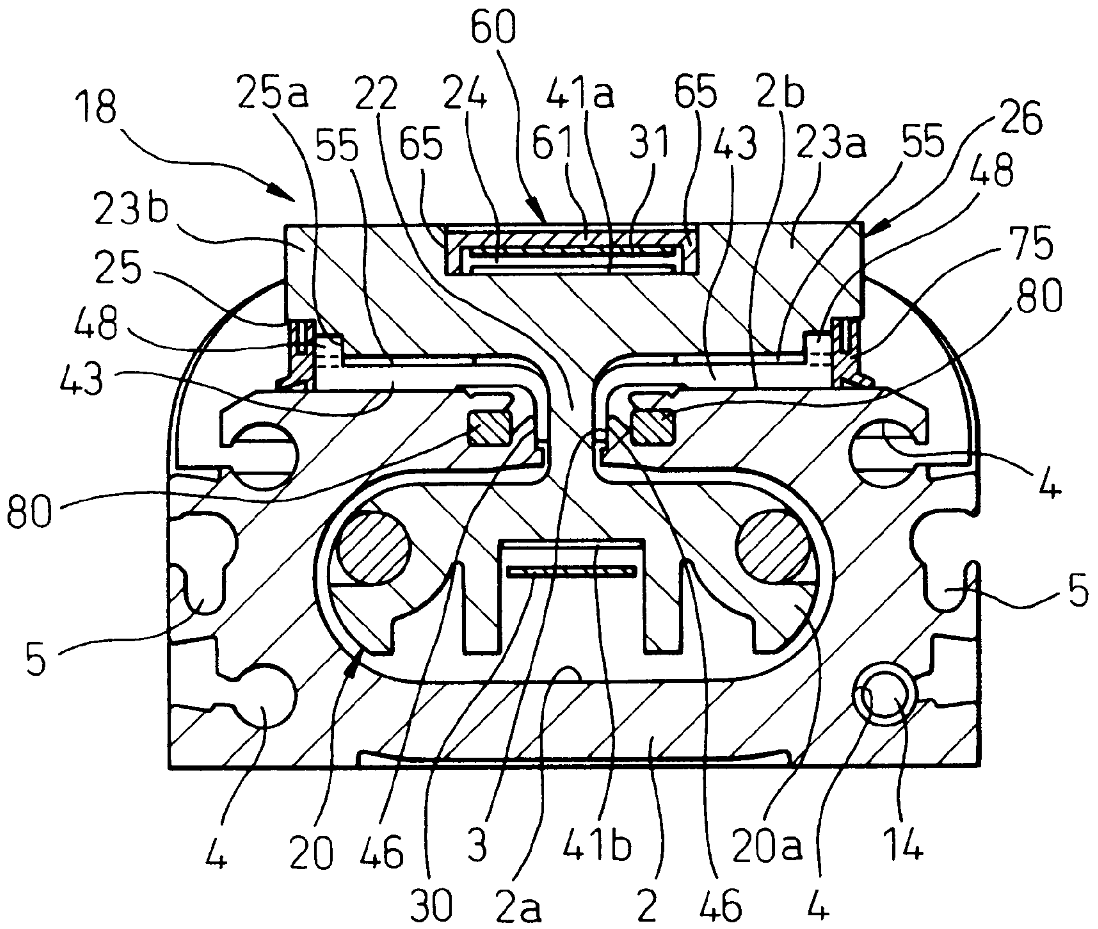
FIG. 3 is a cross sectional view taken along the line III—III in FIG. 2.

Hereinafter, an embodiment of the present invention, applied to a linear actuator utilizing a fluid driven (pneumatic) rodless power cylinder, will be explained with reference to FIGS. 1 through 13. In FIG. 1, reference numeral 1 designates a linear actuator. Numeral 2 is a tube (cylinder tube) of the linear actuator 1 which is made of non-magnetic metal such as aluminum alloy and formed by an extrusion or a drawing process. As shown in FIG. 3, the cylinder tube 2 has a non-circular (in this embodiment, an oblong circular) bore 2*a*. A slit opening 3 is formed on the side wall of the cylinder tube along the entire length thereof. On the outer wall of the cylinder tube 2, grooves 4 for attaching end members to the tube 2 and grooves 5 for mounting attachments, such as sensors, are formed along the entire length of the cylinder tube 2. The groove 4 is formed as a circular hole having a slit (the aperture) opening to the outer wall of the cylinder tube 2.

Figure 13:
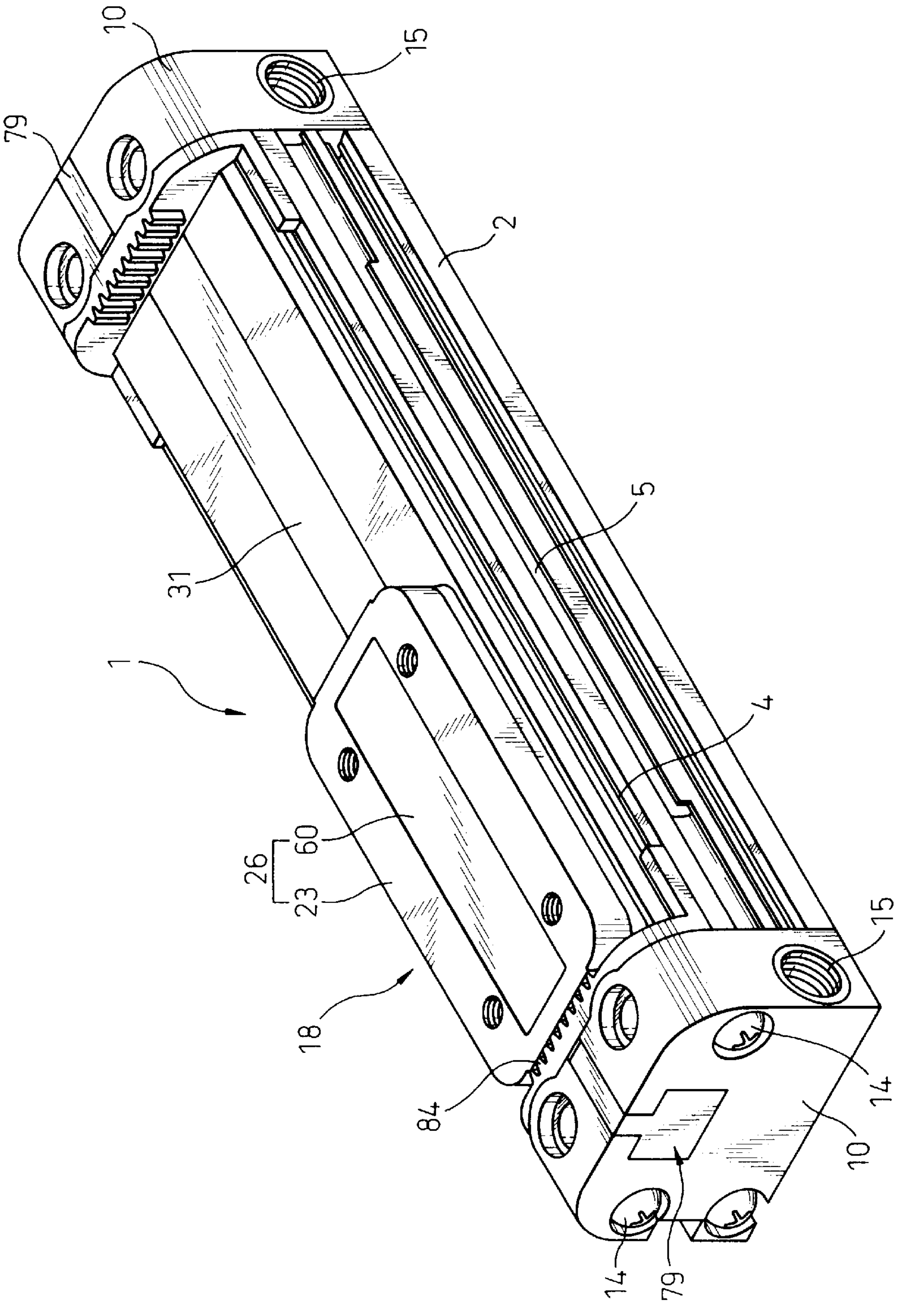
FIG. 13 is a perspective view of the linear actuator in FIG. 1.

Both ends of the cylinder tube 2 are closed by end members (end caps) 10, and a cylinder chamber 6 is defined by the wall of the cylinder bore 2*a* and end caps 10 as shown in FIG. 1. As seen from FIG. 1, the end cap 10 has a portion 12 inserted into the cylinder tube 2 with a cylinder gasket 13 intervening therebetween. In this condition, the end cap 10 is secured to the end of the cylinder tube 2 by tightening self-tapping screws 14 into the ends of the grooves 4 (FIG. 2). A self-tapping screw is a screw which cuts a thread in the wall of a screw hole by itself when it is screwed into the screw hole. In this embodiment, the self-tapping screws 14 are manufactured, for example, in accordance with JIS (Japanese Industrial Standard) No. B-1122. However, other self-tapping screws can be used as the screws 14. By using the self-tapping screws 14, since it is not required to cut the threads on the inner wall of the grooves 4 before attaching the end caps, the manufacturing process of the cylinder tube 2 is largely simplified. In this embodiment, since an inlet and outlet port 15 are provided on the side face of the respective end caps 10, three screws 14 are used for securing each of the end caps 10 (FIG. 13).

The cylinder chamber 6 is divided into a fore cylinder chamber 6A and an aft cylinder chamber 6B by piston ends 21 formed on both sides of a piston 20 (FIG. 1). The piston ends 21 are provided with piston packings 21*a*. On the piston 20, a driving member (a piston yoke) 22 for driving an external moving body 26 through the slit 3 is formed integrally at the portion between the piston ends 21. At the end of the driving member 22 outside of the tube 2, a piston mount 23 which acts as a base of the external moving body 26 is integrally formed. Namely, the piston 20 and the driving member 22 and the piston mount 23 form an integral one-piece moving body 18 in this embodiment. This one-piece moving body 18 is formed by die-casting an aluminum alloy. The piston mount 23 has left and right side walls 23*a*, 23*b* and fore and aft side walls 23*c*, 23*d*. On the upper face of the piston mount 23, a recess 24 is defined by the right and left side walls 23*a* and 23*b* and the fore and aft side walls 23*c* and 23*d* at the portion above the driving member 22. The recess 24 is extending in the direction along the longitudinal axis of the tube 2 from the fore side wall 23*c* to the aft side wall 23*d*. As explained later, the recess 24 forms a channel groove through which an outer seal band passes.

The top M outer face 22*a* and the bottom face 22*b* of the driving member 22 are formed as curved surfaces swelling upward and downward, respectively (FIG. 1). Fore and aft ends of the driving member 22 are formed as fitting portions 27 to which band guides for the inner and the outer seal bands 30 and 31 are fitted.

Figure 4:
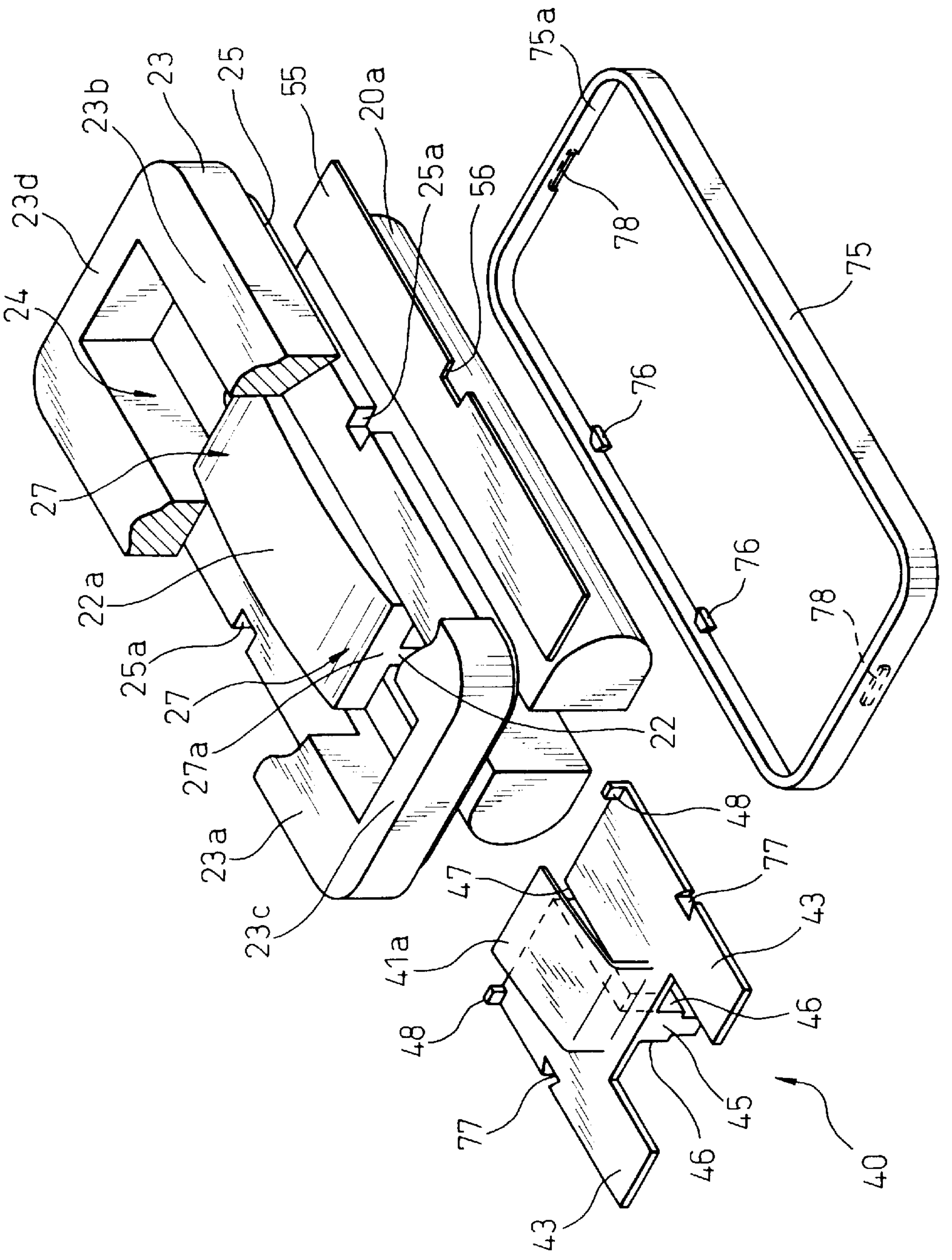
FIG. 4 is an exploded view showing the external moving body, the guide member and the adjusting shim.
Figure 5:
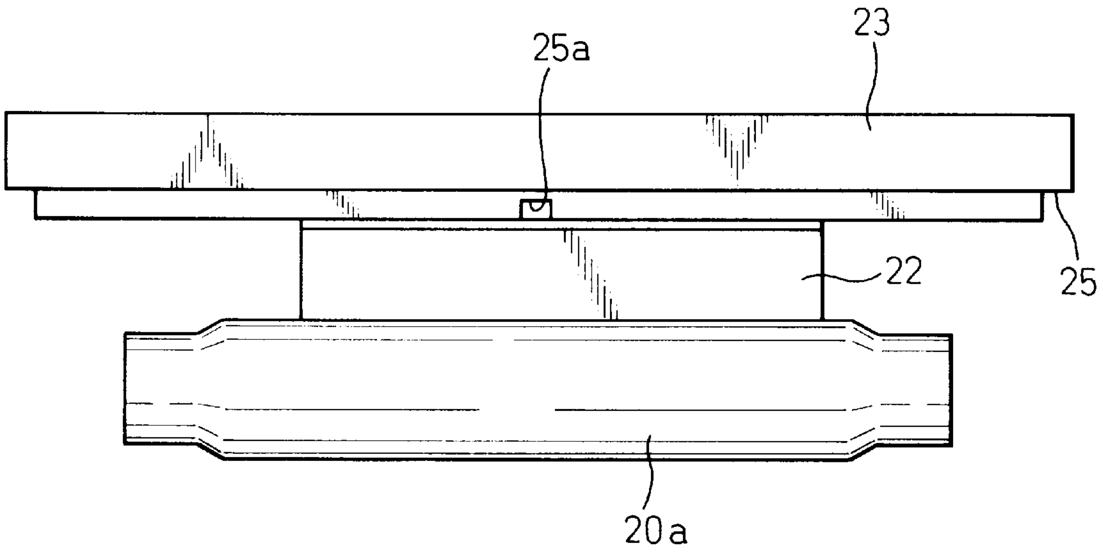
FIG. 5 is a side view of the internal moving body, the driving member and the external moving body formed as an integral one-piece element.
Figure 6:
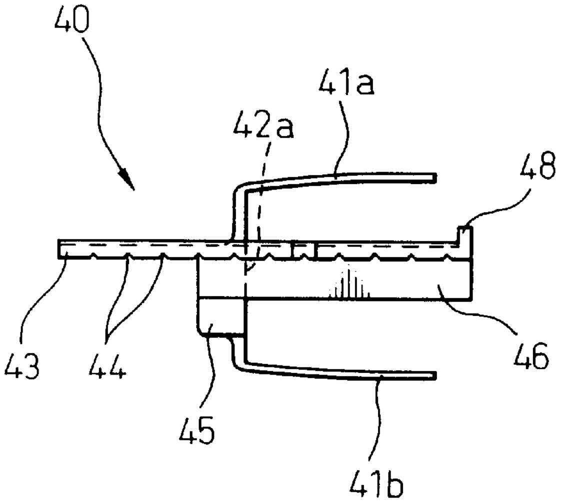
FIG. 6 is a side view of the guide member.
Figure 7:
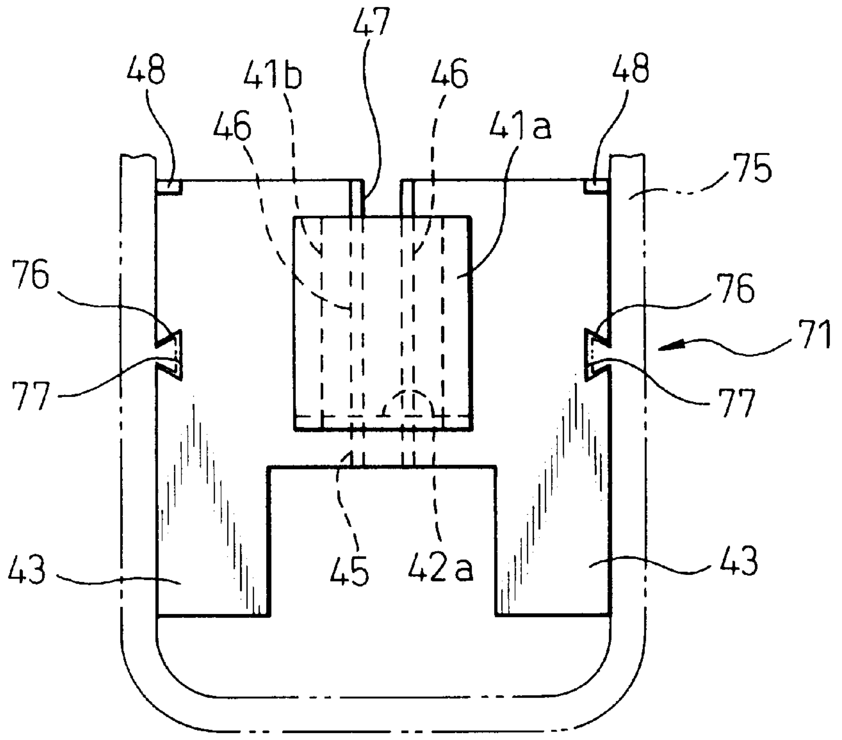
FIG. 7 is a plan view of the guide member in FIG. 6.
Figure 8:
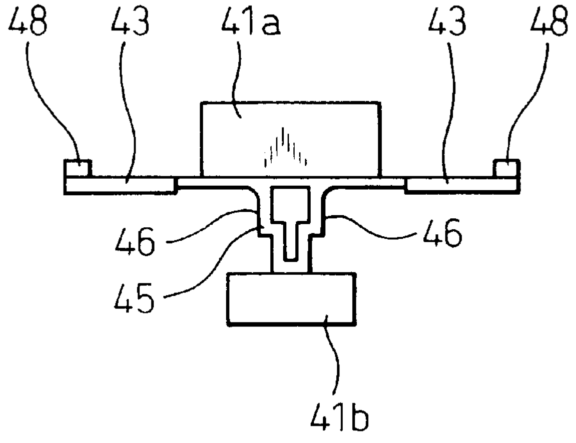
FIG. 8 is a front view of the guide member in FIG. 6.

A stepped portion 25 for receiving a scraper is formed around the periphery of the bottom face of the piston mount 23 as shown in FIGS. 3, 4 and 5. Further, recesses 25*a* are formed on the bottom edges of the right and left side walls at the middle portions thereof. The recesses 25*a*, together with the projection 48 of the guide member 40 explained later, form a means for positioning a slider member.

As explained before, since the moving body 18 consisting of piston 20, driving member 22 and the piston mount 23 are formed as a one-piece element by die-casting an aluminum alloy, the left and right side walls 23*a*, 23*b* and the fore and aft side walls 23*c*, 23*d* of the piston mount 23 are also formed as a one-piece member. Therefore, the number of elements and steps for assembly can be reduced compared to the case where the fore side wall 23*c* and aft side wall 23*d* are formed as separate members from the right and left side walls 23*a*, 23*b*.

FIGS. 6 through 9 illustrate the guide member 40 in this embodiment. The guide member 40 is an integral one-piece element made of, for example, elastic synthetic resin having a low friction coefficient. The guide member 40 is provided with an outer seal band guide 41*a* for guiding the outer seal band 31, an inner seal band guide 41*b* for guiding the inner seal band 30, and a slider member 43 for sliding on the outer wall surface of the tube 2. The outer seal band guide 41*a* has a width matching the width of the outer seal band 31 and curves in such a manner that the upper face thereof forms a convex surface swelling upward. The inner seal band guide 41*b* has a width matching the width of the inner seal band 30 and curved in such a manner that the lower face thereof forms a convex surface swelling downward. The slider member 43 for contacting with the outer wall surface 2*b* of the tube 2 is connected to the outer seal band guide 41*a* and the inner seal band 41*b* at the middle of the fore end of the slider member 43. The outer seal band guide 41*a* extends upward from the upper face of the slider member 43. A pair of sliding members 45, contacting with the side wall surfaces of the slit 3, are formed on the lower face of the slider member 43. The sliding members include the sliding faces 46*a* for sliding on the side wall surfaces of the slit 3. As seen from FIG. 6, inner seal band guide 41*b* extends downward from the end of the sliding member 45. A plurality of oil grooves 44 running in the transverse direction is formed on the lower face of the slider member 43. A slit 47 which fits the end of the driving member 22 is formed on the slider member 43. The slit 47 extends from the portion 42*a* where the outer seal band guide 41*a* and the inner seal band guide 41*b* are connected to the slider member 43 to the end of the slider member 43. Projections 48 are provided at both sides of the longitudinal end of the slider member 43. Recesses 77 are formed on the slider member 43 at the middle of the longitudinal side thereof. The recesses 77 are used for fitting a scraper 75 to the piston mount 23, as explained later.

In order to attach the guide member 40 to the driving member 22, the driving member 22 is inserted into the slit 47 of the guide member 40 until the end 42*a* of the slit 47 abuts the fitting portion 27 of the driving member 22. In this condition, the fitting portion 27 of the driving member 22 spreads the band guides 41*a* and 41*b* and the projections 48 engage with the recesses 25*a* on the bottom face of the driving member 22. Thus, the guide member 40 is firmly held on the driving member 22 by the resilient force of the band guides 41*a* and 42*a* which urge the guide member 40 in the direction away from the driving member 22 and a locking force by the engagement of the projections 48 with the recesses 25*a*. Thus, in this embodiment, the band guides 41*a*, 41*b*, the slit 47, the projections 48 and the recesses 25*a* form quick engaging means 49 which allow the slider member 43 and the band guides 41*a*, 41*b* to be attached to and removed from the driving member 22 easily and quickly.

As explained above, since the slider member 43, the band guides 41*a*, 41*b* and the sliding member 45 are formed as an integral one-piece guide member 40 in this embodiment, the number of elements and steps of assembly of these elements are largely reduced. Further, since the guide member 40 can be attached to the moving body 18 easily and quickly by the quick engaging means 49, screws are not required for attaching the guide member 40 to the moving body 18. Further, when the guide member 40 is attached to the moving body 18, the guide member 40 including the slider member 43 is firmly held in the position and the guide member 40 does not fall from the moving body 18 regardless of the position thereof during assembly of the linear actuator. Therefore, the efficiency of the assembly work is largely improved.

Figure 9:
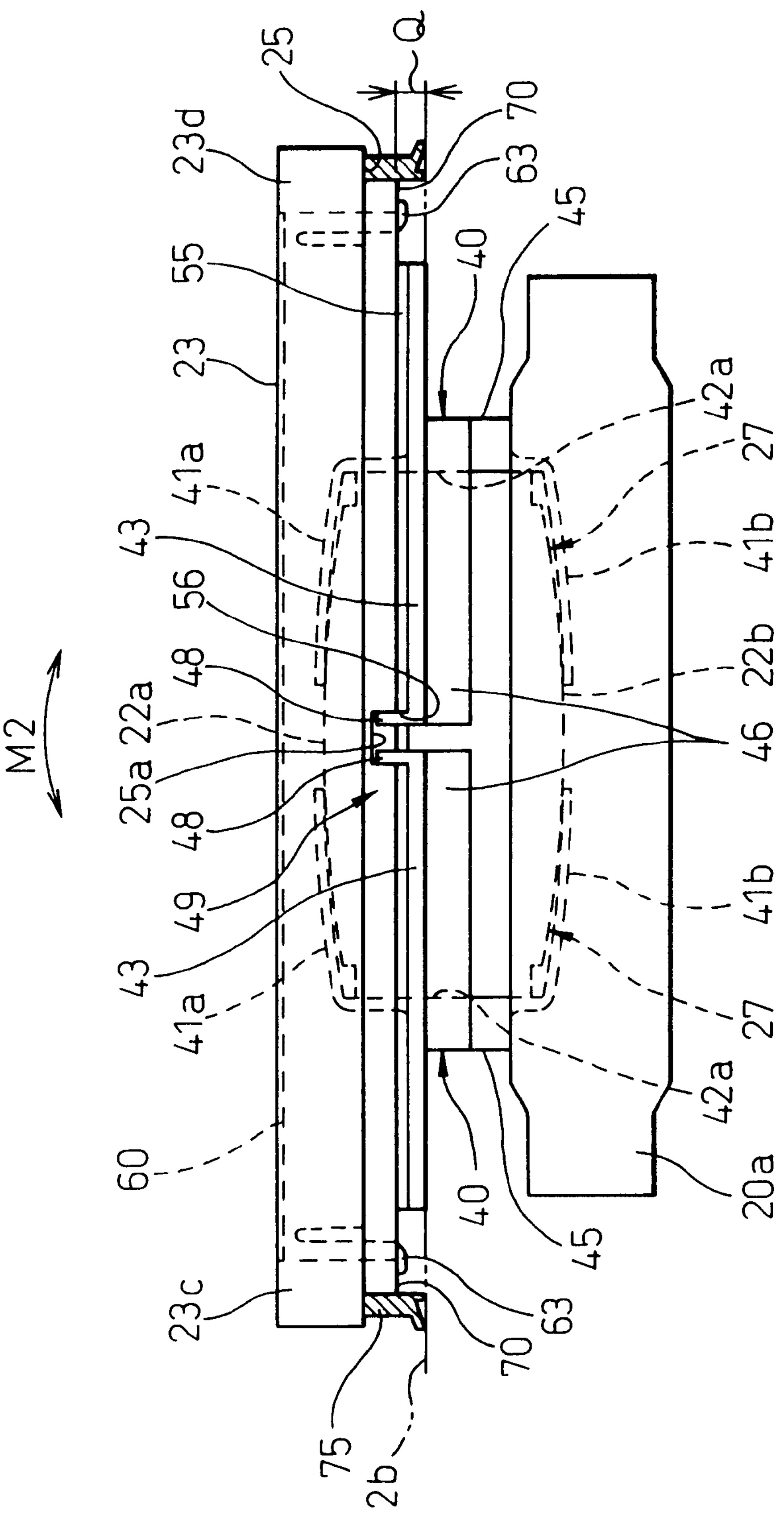
FIG. 9 is a side view showing the guide member and the adjusting shim attached to the one-piece element in FIG. 5.

As seen from FIGS. 4 and 9, adjusting shims 55 are interposed between the slider member 43 of the guide member 40 and the bottom face of the piston mount 23. The adjusting shim 55 is elongated rectangular shape extending in the longitudinal direction so that one adjusting shim covers the slider member 43 on both ends of sliding body 18. The adjusting shim 55 is used for adjusting the contact between the slider member 43 and the outer wall surface 2*b* of the tube 2. Adjusting shim 55 is provided with a notch 56 at the position matching the position of the recess 25*a* of the piston mount 23. Therefore, when the guide member 40 is attached to the sliding body 18, the projection 48 of the slider member 43 engages with the notch 56 as well as with the recess 25*a*. Further, in this position, both longitudinal ends of the adjusting shim 55 abut the inside face of the band guide 41*a* at the position the band guide 41*a* is connected to the slider member 43. Therefore, the adjusting shim 55 is positioned in both longitudinal and transverse directions. In this embodiment, adjusting shims having various thicknesses are prepared when the linear actuator is assembled and a shim having a suitable thickness is selected. As explained above, since the sliding condition of the slider member 43 can be adjusted by the adjusting shim 55 easily and quickly without using any adjusting screws, it is not required to drill holes for adjusting screw.

Further, by interposing the adjusting shim 55 and the slider member 43 between the piston mount 23 and the tube 2, a relatively large clearance (shown by Q in FIG. 9) is formed between the outer wall surface 2*b* and the lower edges of the fore and the aft wall 23*c*, 23*d*. As explained later, this clearance Q is used for operating the engaging hook of the band cover 60 in order to remove the band cover from the sliding body 18.

Figure 10:
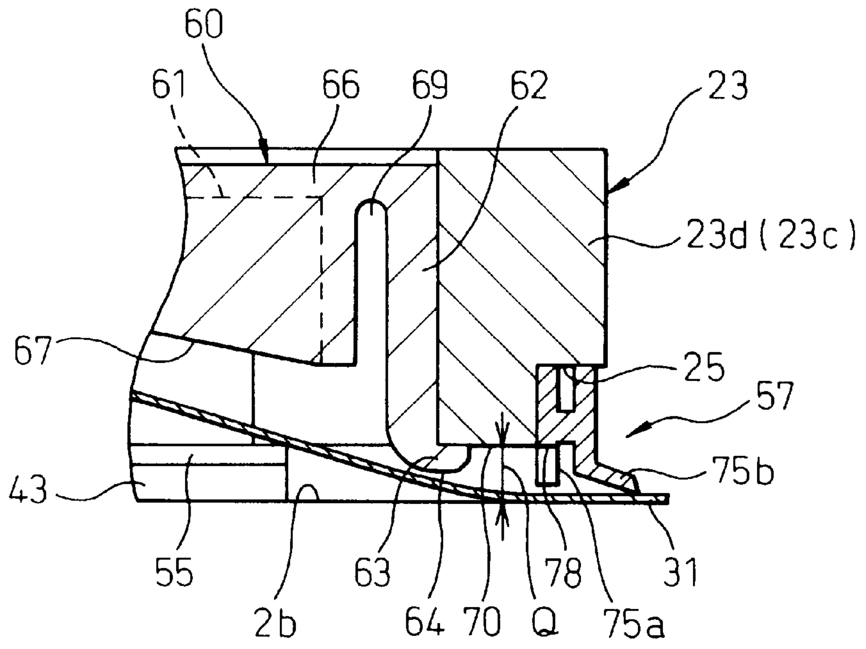
FIGS. 10 and 11 illustrate the hook portion of the band cover when it is engaged with and disengaged from the external moving body.
Figure 11:
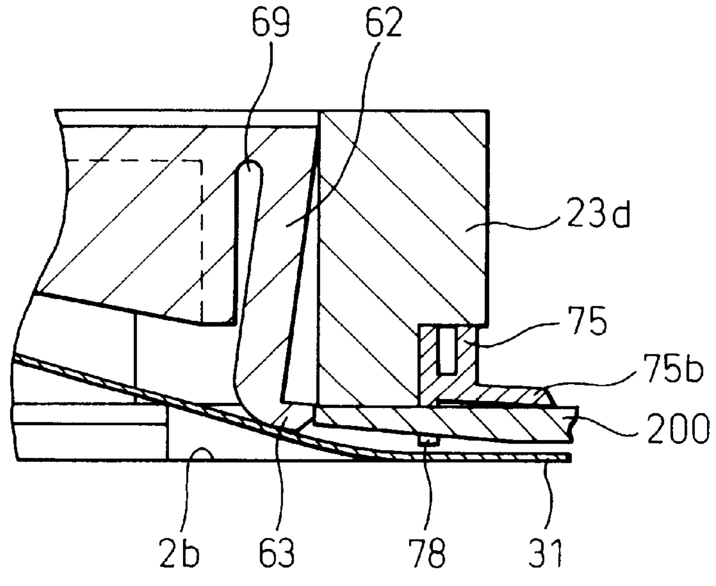

The band cover 60 is formed by elastic synthetic resin having a low friction coefficient (for example, a plastic such as polybutylene terephthalate or polyacetal). The band cover 60 includes a top plate 61 having a width matching the width of the channel groove 24 and arm portions 62 disposed at both longitudinal ends of the top plate 61 (FIGS. 9 through 11). The lower end of the arm portion 62 is formed as a hook 63 facing outward. Further, the bottom end of the hook 63 forms a guide surface 64 for the outer seal band 31. Further, side walls 65 are formed on both transverse sides of the top plate 61, as shown in FIGS. 2 and 3. The inner width of the top plate 61 is slightly larger than the width of the outer seal band 31, and the width of the band guide 41*a* for the outer seal band 31 is smaller than the distance between the side walls 65. A plurality of ribs 66 extending longitudinal direction are formed on the inner face of the band cover 60. In this embodiment, the lower edges of the ribs 66 form a concave guide surface 67 facing downward for guiding the upper face of the outer seal band 31, and the inner faces of the side walls 65 form transverse guide surfaces 68 for guiding the edges of the outer seal band 31. A gap 69 is formed between the side walls 65 and the arm portion 62 to allow the arm portion 62 to deflect inward when the cover 60 is to be removed (FIGS. 10 and 11). The width of the gap 69 is determined in such a manner that it prevents an excessive inward deflection of the arm portion 62 in order to prevent damage to the arm portion 62. Engaging portions 70 which engage with the hooks 63 of the arm portions 62 are formed at lower edges of the fore and aft walls 23*c*, 23*d* of the piston mount 23.

A scraper 75 having double lips is attached to the stepped portion 25 of the piston mount 23 surrounding the peripheries of the guide members 40, slider member 43 and the adjusting shim 55 (FIG. 4). In this embodiment, since the outer periphery of the scraper is exposed to the outside, the appearance of the linear actuator can be improved by selecting an appropriate color for the scraper 75. A pair of inward projections 76 are disposed on the inner periphery of the scraper 75 at the middle of the longitudinal side thereof. The positions of the projections 76 matches the positions of the recesses 77 on the guide members 40 when the scraper 75 is attached to the stepped portion 25 of the piston mount 23. Therefore, by inserting the projections 76 into the recesses 77, the scraper 75 is positioned and held on the piston mount 23. The recesses 77 and the projections 76 form a fitting means 71 for fitting the scraper 75 to the piston mount 23. Though the projections 76 are formed on the scraper 75 and the recesses 77 are formed on the guide member 40, the projections may be formed on the guide unit 40 and the corresponding recesses 77 may be formed on the guide unit 40.

Portions of an inner lip 75*a* of the scraper 75 are cut off at the position corresponding to the hooks 63 of the band cover 60. These cut off portions 78 form apertures through which a tool for releasing the engagements of the hooks 63 and the lower edges of the walls 23*c*, 23*d* of the piston mount 23 is inserted. The outer seal band 31 and the inner seal band 30 are disposed between the end caps 10 on both ends of the tube 2 along the entire length of the slit 3. The outer seal band 31 passes the upper face of the driving member 22, and the inner seal band passes the lower face of the driving member 22. The outer and the inner seal bands are thin flexible bands made of, for example, a magnetic metal such as steel. The seal bands 30 and 31 have widths wider than the slit 3. Both ends of the seal bands 30, 31 are fitted to the end caps 10 by fitting pins 39 inserted into fitting holes 38. Cover members 79 are attached to the end caps 10 in order to cover the outer ends of the fitting pins 39 (FIG. 1). The cover members 79 prevent the fitting pins 39 from falling out from the end caps 10.

In this embodiment, magnets 80 are disposed on both sides of the slit 3 along the entire length thereof. Therefore, the seal bands 30 and 31 are attracted to the magnets 80 along the entire length thereof except the portions thereof passing through the driving member 22. The inner seal band 30 adheres to and seals the slit 3 by the pressure of the fluid in the cylinder chamber 6 and the attracting force of the magnets 80. The outer seal band 31 also adheres to and seals the slit 3 by the attracting force of the magnets 80.

In this embodiment, a pressurized fluid is introduced into one of the cylinder chambers 6A and 6B via inlet/outlet ports 15 on the end caps 10 (FIG. 13), inlet/outlet passages 81 and ports 83 on inner dampers 82. When a pressurized fluid is introduced into one of the cylinder chambers 6A and 6B, the piston 20 and the external moving body 26 moves along the longitudinal axis of the tube 2. The inner dampers 82 abut the piston 20 at its stroke end to absorb the kinetic energy of the piston 20. Further, outer dampers 84 are provided on the tube 2 for the same purpose.

When the band cover 60 is fitted to the channel groove 24 on the piston mount 23, the hooks 63 of the arm portions 62 resiliently engage with the engaging portion of the lower edges of the fore and aft wall 23*c* and 23*d* as shown in FIG. 10. In this condition, the bottom end 64 of the hook 63 acts as a guide surface for the outer seal band 31. In order to remove the band cover 60, a tool 200 having a thin flat shape (such as a driver) is inserted between the lower edge of the outer lip 75*b* of the scraper 75 and the outer wall surface 2*b* of the tube 2 (FIG. 11). By pushing the end of the hook 63 by the tool 200 through the opening 78 of the inner lip 75*a*, the hook 63 is disengaged from the lower edge of the walls 23*c* and 23*d*. Thus, the band cover 60 can be easily removed from the channel groove 24.

When the moving body (piston 20, driving member 22 and the piston mount 23) moves along the slit 3, the outer seal band 31 slides along the channel groove 24. However, since the band cover 60 is fitted into the channel groove 24, the outer surface of the outer seal band 31 and both side edges thereof do not contact the piston mount 23. Further, since the outer seal band 31 and the inner seal band 30 are guided by the band guides 41*a* and 41*b*, the seal bands do not contact the driving member 22. Therefore, wear of the elements (the seal bands 30, 31 and the walls of the channel grooves 24) due to metal to metal contact does not occur. Thus, since the dust generated by the wear does not attach to the seal band, the deterioration of the seal performance and the shortening of the service life of the seal bands 30 and 31 are prevented. The scraper 75 having double lips prevents intrusion of dust from outside into the space between the piston mount 23 and the outer surface 2*b* of the tube 2.

Figure 12:
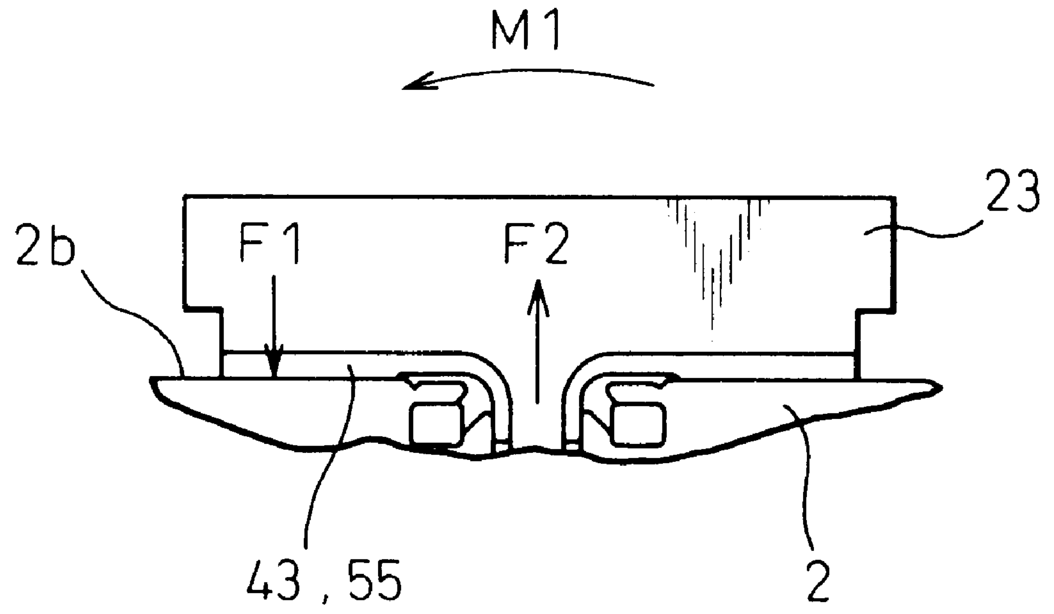
FIG. 12 illustrates the direction of bending moment exerted on the driving member.

When a force is exerted on the driving member 22 in the direction perpendicular to the upper face of the piston mount 23, this force is received by the outer wall surface 2*b* of the tube 2 through the adjusting shims 55 and the slider members 43 and substantially no force is exerted on the piston 20. Therefore, the piston is not pushed against the wall of the bore of the tube 2 and the friction between the piston 20 and the wall of the bore does not increase. Further, as shown in FIG. 11, when a moment M1 is exerted on the piston mount 23 in the plane perpendicular to the longitudinal axis, this moment M1 is cancelled by the reaction force F1 and F2 perpendicular to the outer wall surface 2*b* as shown in FIG. 12. In this case, the force F1 is received by the outer wall surface 2*b* and the force F2 is received by the driving member 22. Therefore, substantially no bending moment is exerted on the driving member 22. Since no bending moment is exerted on the driving member 22, damage to the driving member 22 is prevented even if a relatively large moment M1 is exerted on the piston mount 23. This is also true in the case where a moment M2 is exerted on the piston mount 23 in the plane including the longitudinal axis of the tube 2 (FIG. 9).

Figure 14:
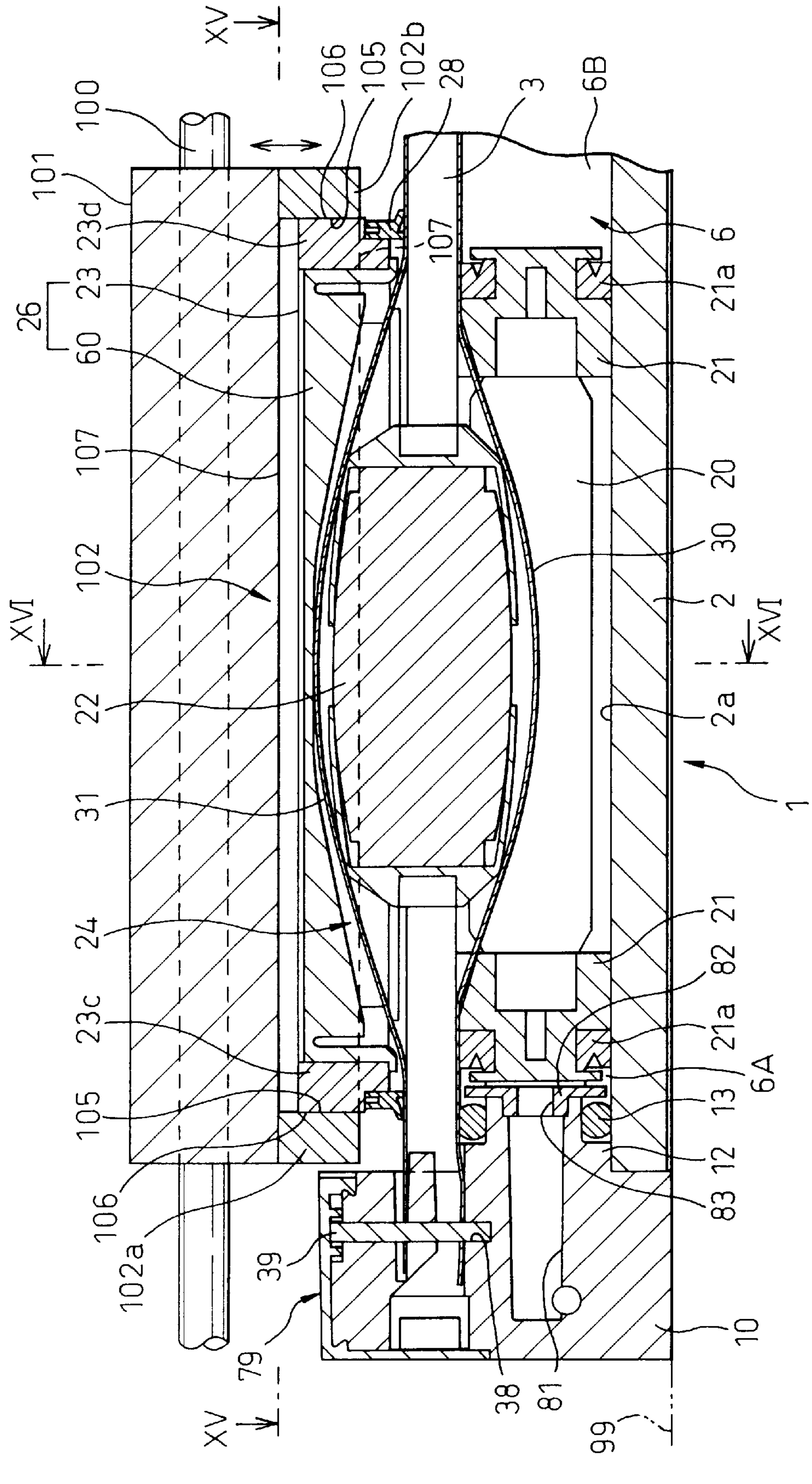
FIG. 14 is a longitudinal sectional view of the linear actuator according to another embodiment of the present invention which shows the coupling member for connecting the external moving body to the sliding body.
Figure 15:
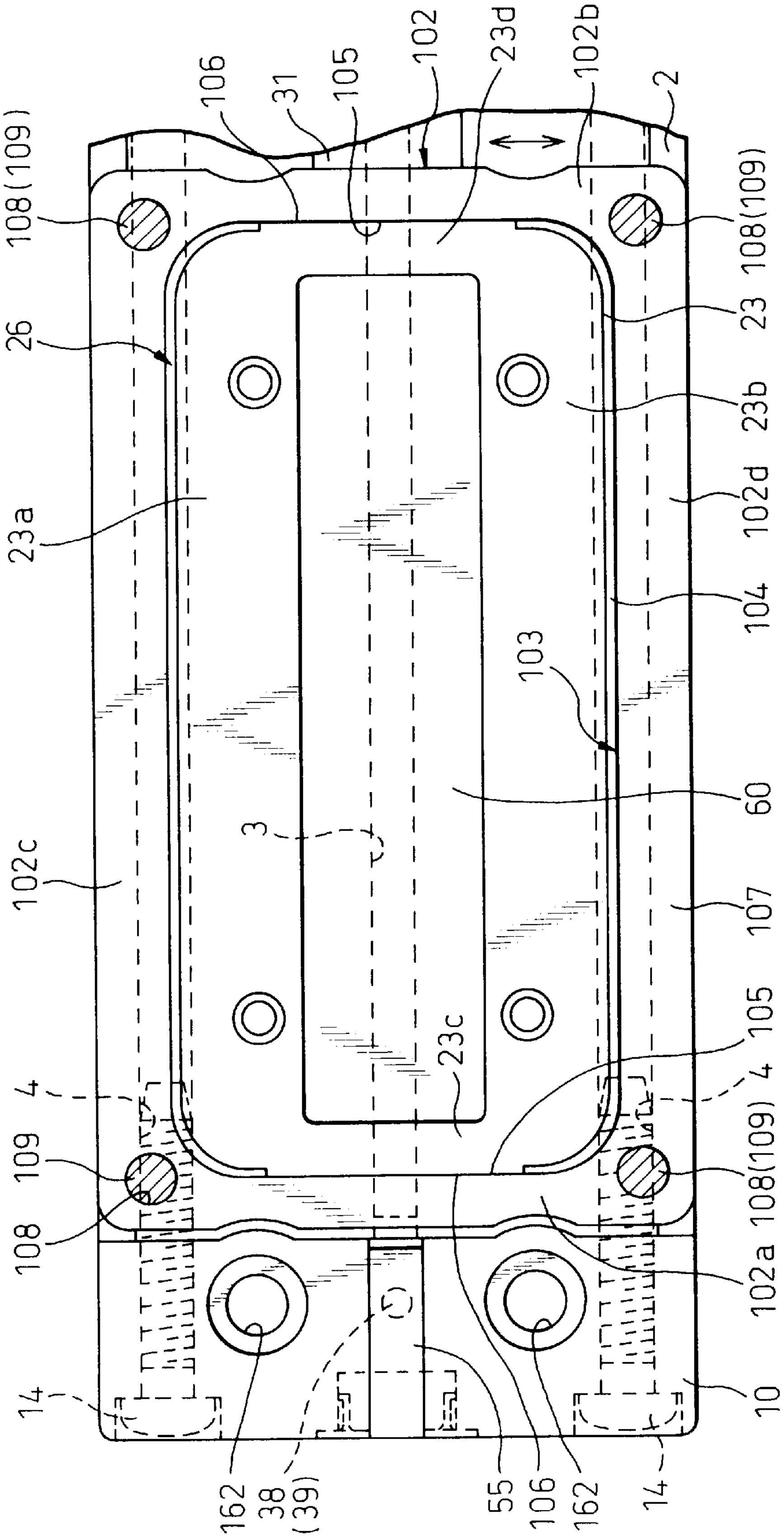
FIG. 15 is a sectional view taken along the line XV—XV in FIG. 14.
Figure 16:
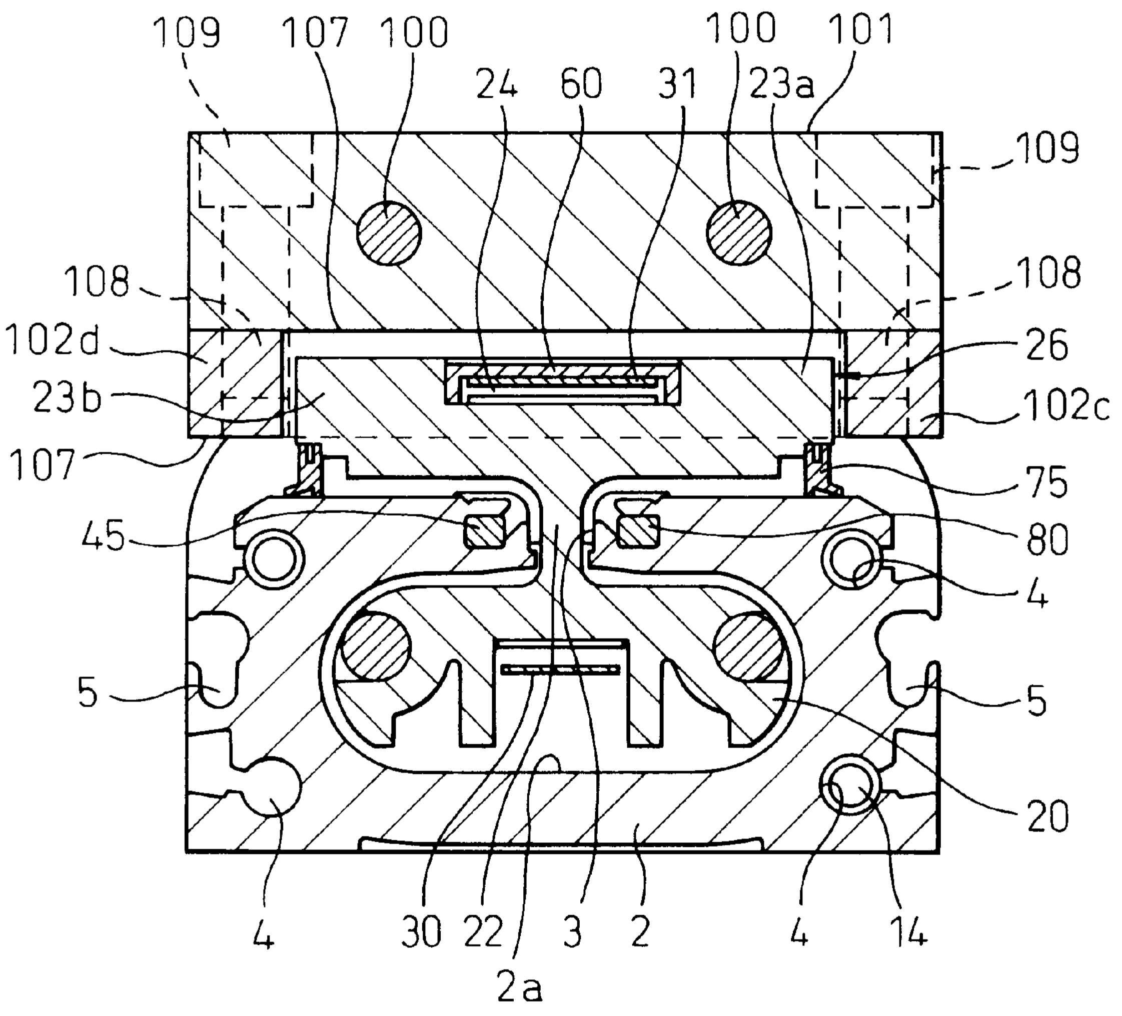
FIG. 16 is a sectional view taken along the line XVI—XVI in FIG. 14.

FIGS. 14 through 16 show another embodiment of the present invention. In FIGS. 14 through 16, reference numerals the same as those in FIGS. 1 through 13 designate similar elements.

In this embodiment, the linear actuator 1 is fixed to an external structure 99 such as a machine base by anchor bolts through the anchor holes 162 (FIG. 15) on the end caps 10. Further, a pair of guide rails (guide rods) 100 are disposed above the external moving body 26. The guide rails 100 extend in parallel with the longitudinal axis of the tube 2. A sliding body 101, which is guided by the guide rails 101 are disposed above the external moving body 26 and coupled to the external moving body 26 by a coupling device 102. The sliding body 101 is, for example, used for carrying articles.

The coupling device 102 is an annular plate of a substantially rectangular configuration which has fore and aft walls 102*a* and 102*b* extending perpendicular to the longitudinal axis of the tube 2, side walls 102*c* and 102*d* connecting the fore wall 102*a* and the aft wall 102*b* and a substantially rectangular opening 103 surrounded by the walls 102*a*, 102*b*, 102*c* and 102*d*. The coupling device 102 is attached to the piston mount 23 by fitting the piston mount 23 into the aperture 103 of the coupling device 102. The coupling device 102 is fixed to the sliding body 101 by fitting screws 109 through screw holes 108 penetrating the coupling device 102.

On the inner surfaces of the fore and aft walls 102*a* and 102*b*, contact faces 105 are formed by machining so that, when the piston mount 23 is inserted into the aperture 103 of the coupling device 102, contact faces on the fore and aft walls 102*a*, 102*b* engage with the corresponding contact faces 106 formed on the outer surfaces of the fore and aft walls 23*c* and 23*d*. The distance between the contact faces 105 of the coupling device 102 is set slightly larger than the distance between the contact faces 106 of the piston mount 23. Further, the distance between the inner surfaces of the side walls 102*c* and 102*d* of the coupling device 102 is set larger than the distance between the outer surfaces of the side walls 23*a* and 23*b* of the piston mount 23. This configuration allows a relative movement of the coupling device 102 to the piston mount 23 in the direction perpendicular to the guide rail 100, while locking the coupling device 102 to the piston mount 23 in the direction along the guide rail 100. The thickness of the coupling device 102 is equal to, or slightly smaller than, the height of the contact face 106 of the piston mount 23, and both of the upper face and the lower face of the coupling device 102 are machined to form contact faces 107 which can engage with a contact face formed on the bottom face of the sliding body 101.

Since the coupling device 102 is formed as an annular plate, the coupling device can be easily formed by an extrusion process. Further, since the screw holes 108 penetrate the coupling device and the contact faces 107 are formed on both sides of the coupling device, the coupling device 102 can be fitted to the piston mount 23 even in an upside-down position. Therefore, the coupling device 102 can be easily fitted to the piston mount 23 during the assembly of the linear actuator. Further, since the engagement between the contact faces 105 of the coupling device 102 and the contact faces 106 of the piston mount 23 allows a relative movement between the coupling device 102 and the piston mount 23 in the direction perpendicular to the longitudinal axis of the tube 2, it is not required to adjust the guide rail 100 in such a manner that it becomes strictly parallel to the longitudinal axis of the tube. Therefore, the alignment between the guide rails 100 and the tube 2 can be easily adjusted.

According to the present embodiment, the load exerted on the sliding body is received by the guide rails 100 and is not transferred to the piston 20. Therefore, the movement of the piston 20 is not hampered even if a relatively large load is exerted on the sliding body 101. Further, since the thickness of the coupling device 102 is equal to or smaller than the piston mount 23, the piston mount 23 and the coupling device 102 overlap each other when the coupling device 102 is attached to the piston mount 23. Therefore, the height of the linear actuator (in this embodiment, the distance between the external structure 99 and the top surface of the sliding body 101) becomes smaller compared to the same in the related art.

Further, the sliding body 101 and the piston mount 23 can be coupled by the coupling device 102 even after the tube 2 and guide rails are mounted on the external structure 99. In this case, the sliding body 101 is moved on the guide rails to a position away from the piston mount 23 and the coupling device 102 is fitted to the piston mount 23. After fitting the coupling device 102 to the piston mount 23, the sliding body 101 is moved to the position where it overlaps the coupling device 102 in order to fit the coupling device 102 to the sliding body 101 by the fitting screws 109.

Though the contact faces 107 are formed on the entire surfaces of the upper face and the lower face of the coupling device 10 in this embodiment, the contact faces may be formed only around the screw holes 108. Further, though the annular shaped coupling device is used in this embodiment, the coupling device may be U-shaped in which the fore and the aft walls 102*a* and 102*b* are connected by only one side wall.

We claim:

1. A linear actuator comprising:

a tube provided with a slit which penetrates the wall of the tube and extends parallel to the longitudinal axis of the tube;

an internal moving body disposed in the bore of the tube and movable therein along the direction of the longitudinal axis of the tube;

an external moving body disposed outside of the tube and coupled to the internal moving body by a driving member through the slit in the tube so that the external moving body moves with the internal moving body along said slit, the driving member having an inner face located inside of the tube and an outer face located outside of the tube;

an outer seal band and an inner seal band extending along and covering the slit from the outside and the inside of the tube, said outer seal band and inner seal band passing the the respective outer and inner faces of the driving member;

a slider member attached to the external moving body on the bottom face thereof facing the outer wall surface of the tube and sliding on the outer wall surface with the movement of the external moving body;

a pair of band guides attached to the driving member at a longitudinal end thereof for guiding the outer and the inner seal bands to the outer face and inner face of the driving member;

wherein the band guide and the slider member are formed as an integral one-piece element.

2. A linear actuator as set forth in claim 1, wherein the slider member includes an integral sliding member for sliding on a side wall of the slit extending along the longitudinal axis of the tube.

3. A linear actuator as set forth in claim 1, wherein the slider member is attached to the external moving body by quick engaging means which allows the slider member to be attached and removed easily and quickly.

4. A linear actuator as set forth in claim 3, wherein the band guide is snap fitted to the longitudinal end of the external moving body and wherein the quick engaging means includes an engaging member which engages with a engaging portion formed on the external moving body when the band guide is snap fitted to the external moving body in order to position and fix the slider member to the external moving body.

5. A linear actuator as set forth in claim 1, further comprising an adjusting member interposed between the bottom face of the external moving body and the slider member for adjusting the contact between the slider member and the outer wall surface of the tube.

6. A linear actuator as set forth in claim 1, wherein the outer seal band passes through a channel groove formed on the top surface of the external moving body and wherein a band cover for covering the channel groove is disposed on the top surface of the external moving body, said band cover including a fixing means for resiliently engaging with the channel groove in order to fit the band cover to the groove, and wherein the external moving body is provided with an aperture through which the fixing means is operated to release the engagement between the fixing means and the channel groove.

7. A linear actuator as set forth in claim 6, wherein the fixing means includes a hook portion made of resilient material formed on the band cover and a engagement portion formed on the external moving body which engages with the hook portion.

8. A linear actuator as set forth in claim 6, wherein the external moving body is provided with a wall extending in the direction perpendicular to the longitudinal axis of the tube and having lower end facing the outer wall surface of the tube, and the fixing means includes a hook portion formed on the band cover and engaging with the lower end of the wall and wherein the aperture through which the fixing means is operated to release the engagement is defined by the lower end of the wall and the outer wall surface of the tube.

9. A linear actuator as set forth in claim 7, wherein a guide face for guiding the outer face of the outer seal band is formed on the hook portion at the bottom facing the outside wall of the tube.

10. A linear actuator as set forth in claim 6, wherein transverse guide faces facing the longitudinal edges of the outer seal band and a longitudinal guide face facing the outer surface of the outer seal band are formed on the inner surface of the band cover.

11. A linear actuator as set forth in claim 6, wherein a scraper having double lips is provided on the periphery of the bottom face of the external moving body in order to prevent intrusion of dust into the clearance between the bottom face of the external moving body and the outer surface of the tube and wherein the portion of the inner lip of the scraper is cut off at the position corresponding to the position of the aperture of the external moving body for operating the fixing means.

12. A linear actuator as set forth in claim 1, wherein the internal moving body and the driving member and the external moving body are formed as an integral one-piece element.

13. A linear actuator as set forth in claim 1 further comprising a sliding body guided along a predetermined path, a coupling device including positioning members abutting both longitudinal ends of the external moving body and connecting members disposed on both sides of the external moving body and connecting both positioning members to each other, wherein the external moving body is connected to the sliding body by attaching the top faces of the positioning members or the connecting members to the bottom surface of the sliding body.

14. A linear actuator comprising:

a tube provided with a slit which penetrates the wall of the tube and extends parallel to the longitudinal axis of the tube;

an internal moving body disposed in the bore of the tube and movable therein along the direction of the longitudinal axis of the tube an external moving body disposed outside of the tube and coupled to the internal moving body by a driving member through the slit in the tube so that the external moving body moves with the internal moving body along said slit, the driving member having an inner face located inside of the tube and an outer face located outside of the tube;

an outer seal band and an inner sear band extending along and covering the slit from the outside and the inside of the tube, said outer seat band and inner seal band passing the outer face and the inner face, respectively, of the driving member;

a sliding member disposed between the driving member and a side wall of the slit extending along the longitudinal axis of the tube for sliding on the side wall surface with the movement of the external moving body;

a pair of band guides attached to the driving member at a longitudinal end thereof for guiding the outer and the inner seal bands to the outer face and the inner face of the driving member;

wherein the band guide and the sliding member are formed as an integral one-piece element.

* * * * *